US012799801B2

(12) United States Patent
Tooke

(10) Patent No.: US 12,799,801 B2
(45) Date of Patent: Nov. 17, 2026

(54) SECURE STORAGE SYSTEM AND METHOD

(71) Applicant: Trevor Tooke, Baldwinsville, NY (US)

(72) Inventor: Trevor Tooke, Baldwinsville, NY (US)

( * ) Notice: Subject to any disclaimer, the term of this patent is extended or adjusted under 35 U.S.C. 154(b) by 7 days.

(21) Appl. No.: 18/894,102

(22) Filed: Sep. 24, 2024

(65) Prior Publication Data

US 2026/0085573 A1 Mar. 26, 2026

(51) Int. Cl.
*E05G 1/10* (2006.01)
*E05G 1/02* (2006.01)
*G07C 9/00* (2020.01)
*G07C 9/37* (2020.01)

(52) U.S. Cl.
CPC ................. *E05G 1/10* (2013.01); *E05G 1/02* (2013.01); *G07C 9/00563* (2013.01); *G07C 9/37* (2020.01)

(58) Field of Classification Search
CPC .... E05G 1/10; E05G 1/02; G07C 9/37; G07C 9/00563; G07C 9/00912; G08B 25/14; G08B 25/01
See application file for complete search history.

(56) References Cited

U.S. PATENT DOCUMENTS 6,510,642 B2 1/2003 Riener
8,186,188 B1 5/2012 Brown
9,316,039 B2 4/2016 Stevenson
9,754,467 B1 9/2017 Harrison
10,132,113 B2 11/2018 Stevenson
11,017,357 B2 * 5/2021 Maki ........................ G07C 1/32
11,972,650 B2 4/2024 Rambadt et al.
2017/0027079 A1 * 1/2017 Dombrowski .......... H02M 7/04
2018/0070753 A1 * 3/2018 Eveloff ................. H04W 4/025
2019/0077597 A1 * 3/2019 Janwadkar .............. C07F 11/00
2019/0158650 A1 * 5/2019 Isgar ........................ H04W 4/80
2019/0236553 A1 * 8/2019 Maki .................. G07C 9/00563
2019/0287063 A1 * 9/2019 Skaaksrud ........... G06Q 10/083

* cited by examiner

*Primary Examiner* — Mirza F Alam
(74) *Attorney, Agent, or Firm* — PATENTFILE, LLC; Bradley C. Fach; Steven R. Kick

(57) ABSTRACT

A secure storage system may include a primary response device, a secondary response device, and a secure storage device. The primary response device may generate a primary wireless alert signal. The secondary response device may generate a secondary wireless alert signal in response to receiving the primary wireless alert signal. The secure storage device may have a body, a storage cavity, a door, and a locking mechanism. The locking mechanism may govern the ability of the door to be moved from the closed position in which the storage cavity is inaccessible and into the open position. The locking mechanism may require receiving an unlocking input from a user and the communication module may also require receiving the secondary wireless alert signal before the locking mechanism is changeable from the locked state to the unlocked state to allow the door to be opened and the storage cavity accessed.

19 Claims, 5 Drawing Sheets

SECURE STORAGE SYSTEM AND METHOD

FIELD OF THE INVENTION

This patent specification relates to the field of systems and methods for securely storing and controlling access to objects, such as firearms, in public locations.

BACKGROUND

There has been a consistent increase in the number of individuals that threaten violence and that perform violence in public locations and buildings, such as schools, business, government buildings, etc. Many people believe that arming staff and other responsible individuals in these locations and buildings can help keep individuals safe in the event of a shooter or other violent threat. Schools in particular have become a target for violent individuals, and many believe that providing controlled access to firearms and other defensive equipment to responsible individuals and staff may prevent, stop and deter violent individuals from targeting schools and other public locations and buildings. However, it is important that storage of firearms and other defensive equipment in these public places must not only be secure to prevent unauthorized access, but must also be able to coordinate a response from a plurality of individuals versus the responsibility resting on a single individual or isolated individuals.

Therefore, a need exists for novel systems and methods for securely storing and controlling access to objects, such as firearms, in public locations.

BRIEF SUMMARY OF THE INVENTION

According to one aspect consistent with the principles of the invention, a secure storage system is provided. In some embodiments, the system may include a primary response device, a secondary response device, and a secure storage device. The primary response device may have a first control input and a first radio module, and the first radio module may be configured to generate a primary wireless alert signal when the first control input is operated by a user, such as a first user. The secondary response device may have a second radio module, and the second radio module may be configured to generate a secondary wireless alert signal in response to receiving the primary wireless alert signal. The secure storage device may have a body, a storage cavity, a door, a communication module, and a locking mechanism. The body may define the storage cavity, and the door may be movably coupled to the body so that the door is movable between a closed position and an open position. The storage cavity may be accessible when the door is in the open position and the storage cavity may be inaccessible when the door is in the closed position. The locking mechanism may govern the ability of the door to be moved from the closed position and into the open position. The communication module may be in electronic communication with the locking mechanism, and the locking mechanism may be changeable between a locked state and an unlocked state. When the locking mechanism is in the locked state the door is not able to be moved from the closed position and into the open position, and when the locking mechanism is in the unlocked state the door is able to be moved from the closed position and into the open position. The locking mechanism may require receiving an unlocking input from a user, such as a second user, and the communication module may also require receiving the secondary wireless alert signal before the locking mechanism is changeable from the locked state to the unlocked state.

According to another aspect consistent with the principles of the invention, a secure storage method is provided. In some embodiments, the method may include the steps of: generating a primary wireless alert signal via a primary response device, the primary response device having a first control input and a first radio module, and the first radio module may be configured to generate the primary wireless alert signal when the first control input is operated; generating a secondary wireless alert signal via a secondary response device, the secondary response device having a second radio module, and the second radio module may be configured to generate a secondary wireless alert signal in response to receiving the primary wireless alert signal; receiving, via a communication module of a secure storage device, the secondary wireless alert signal, the secure storage device having a body, a storage cavity, a door, and a locking mechanism, the body may define the storage cavity, the door may be movably coupled to the body so that the door is movable between a closed position and an open position, the storage cavity may be accessible when the door is in the open position and the storage cavity is inaccessible when the door is in the closed position, the locking mechanism may govern the ability of the door to be moved from the closed position and into the open position, the communication module may be in electronic communication with the locking mechanism, the locking mechanism may be changeable between a locked state and an unlocked state, when the locking mechanism is in the locked state the door is not able to be moved from the closed position and into the open position, and when the locking mechanism is in the unlocked state the door is able to be moved from the closed position and into the open position; receiving, via the locking mechanism, an unlocking input from a user; and changing the locking mechanism of the secure storage device changing from the locked state to the unlocked state after both of: the secondary wireless alert signal is received by the communication module; and the unlocking input is received via the locking mechanism.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
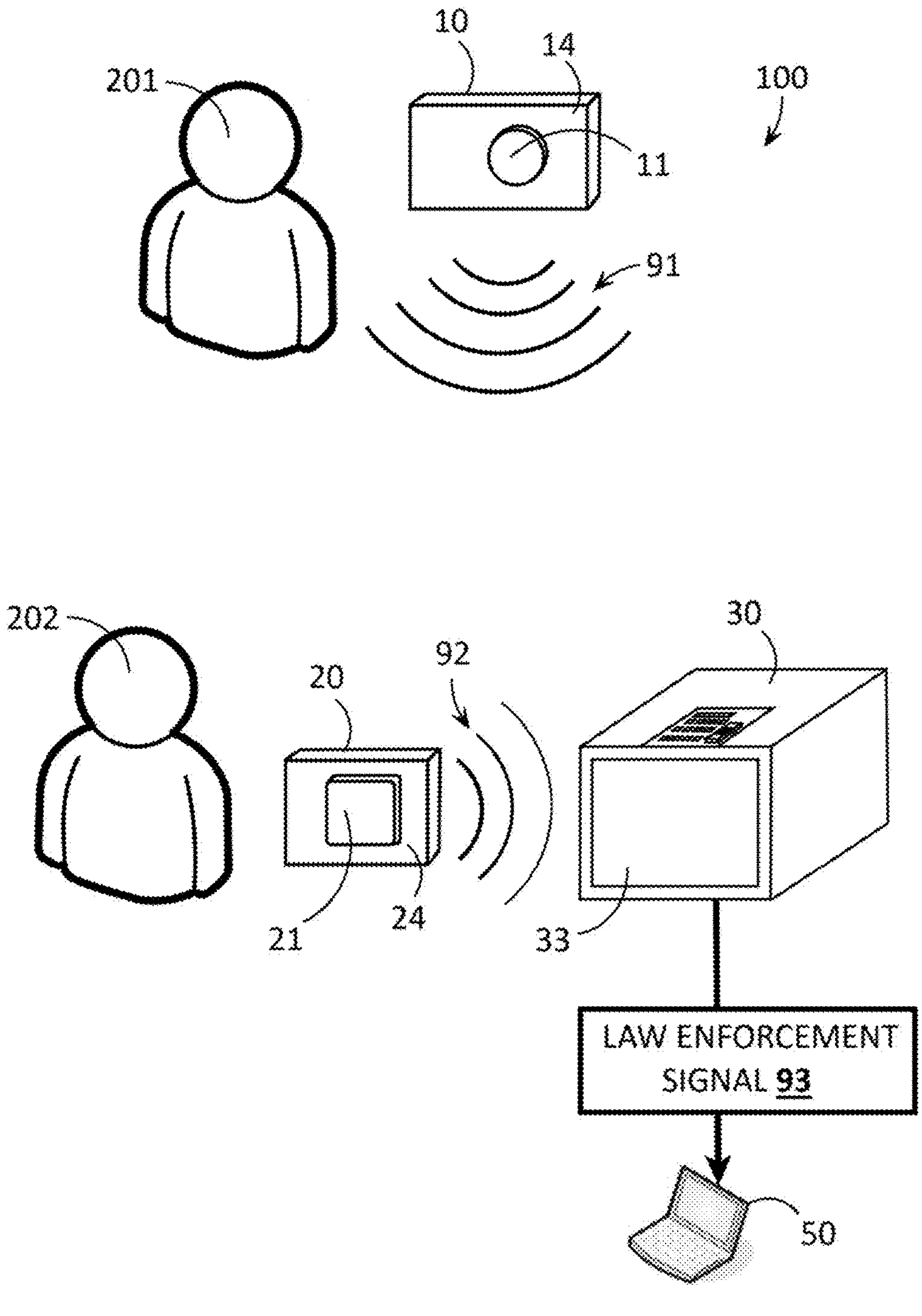
FIG. 1—FIG. 1 depicts a schematic diagram of an example of a secure storage system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 15% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new secure storage system and method are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments.

The present invention will now be described by example and through referencing the appended figures representing preferred and alternative embodiments. FIG. 1 illustrates an example of a secure storage system ("the system") 100 according to various embodiments. In some embodiments, the system 100 may comprise a primary response device 10, a secondary response device 20, and a secure storage device 30. The primary response device 10 may have a control input 11 and a radio module 12, and the radio module 12 may be configured to generate a primary wireless alert signal 91 when the control input 11 is operated by a first user 201. The secondary response device 20 may have a radio module 22, and the radio module 22 may be configured to generate a secondary wireless alert signal 92 in response to receiving primary wireless alert signal 91. The secure storage device 30 may have a body 31, a storage cavity 32, a door 33, a communication module 42, and a locking mechanism 35. The body 31 may define the storage cavity 32, and the door 33 may be movably coupled to the body 31 so that the door 33 may be movable between a closed position 71 and an open position 72. The storage cavity 32 may be accessible when the door 33 is in the open position 72, and the storage cavity 32 may be inaccessible when the door 33 is in the closed position 71. The locking mechanism 35 may govern the ability of the door 33 to be moved from the closed position 71 and into the open position 72. The communication module 42 may be in electronic communication with the locking mechanism 35, and the locking mechanism 35 may be changeable between a locked state and an unlocked state. When the locking mechanism 35 is in the locked state the door 33 generally is not able to be moved from the closed position 71 and into the open position 72, when the locking mechanism 35 is in the unlocked state the door 33 is generally able to be moved from the closed position 71 and into the open position 72. The locking mechanism 35 may require receiving an unlocking input from a user, such as a second user 202 and the communication module 42 may require receiving the secondary wireless alert signal 92 before the locking mechanism 35 is changeable from the locked state to the unlocked state.

In some embodiments, the system 100 may comprise at least one primary response device 10, at least one secondary response device 20, and at least one secure storage device 30. In preferred embodiments, the system 100 may comprise at least one primary response device 10, a plurality of secondary response devices 20, and a plurality of secure storage devices 30, with each secondary response device 20 configured to: receive primary wireless alert signals 91 generated by the primary response device 10; and to generate a secondary wireless alert signal 92 that may be required to open the door 33 of a secure storage device 30. Optionally, a secure storage device 30 may require receiving a secondary wireless alert signal 92 that may be uniquely generated by a secondary response device 20. Optionally, a secondary wireless alert signal 92 may be used to unlock one or more secure storage devices 30.

In preferred embodiments, a primary response device 10 may comprise a portable electronic device which may be carried on the person of a user, such as a first user 201. A first user 201 may comprise an individual that may be assigned to function as a party responsible for ensuring the safety of a public location or building, such as a school, business, government building, stadium, etc. As an example, a public location may comprise a school, and first user 201 may comprise a school principal, safety officer, or some other executor of authority of the school.

Figure 2:
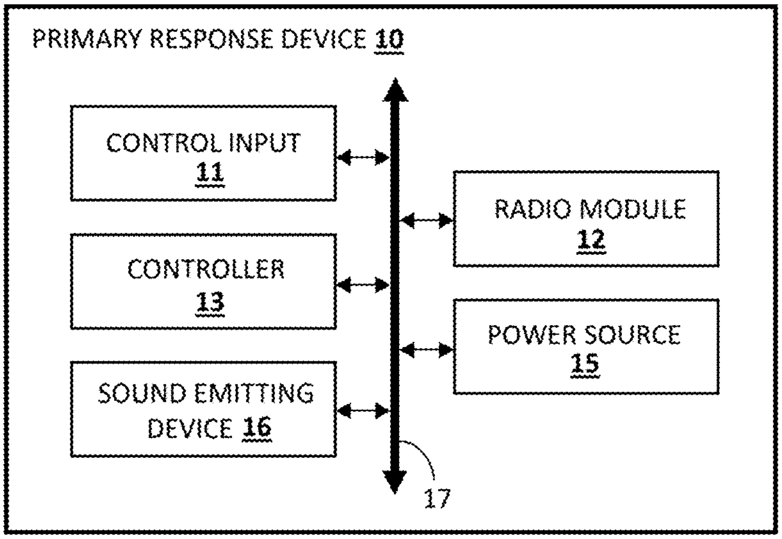
FIG. 2—FIG. 2 illustrates a block diagram of some exemplary components of an example of a primary response device according to various embodiments described herein.

FIG. 2 depicts a block diagram illustrating some exemplary components that a primary response device 10 may comprise. In some embodiments, a primary response device 10 may comprise one or more of a control input 11, a radio module 12, a controller 13, a power source 15, a sound emitting device 16, and a local interface 17 which may be contained in and/or coupled to a primary body 14. A primary body 14 may be configured in any shape and size. In preferred embodiments, primary body 14 may be configured as a key fob or other hand-held device form factor that may be easily carried by or on the person of an individual, such as a first user 201.

In some embodiments, a primary response device 10 may comprise may comprise one or more control inputs 11 that a user 201 may interact with or operate, such as turnable control knobs, a key pad, slide type switches, rocker type switches, toggle switches, push button or depressible button type switches, rotary switches, electromechanical relays, solid state relays, touch sensitive interfaces, and combinations thereof whether they are normally open, normally closed, momentary contact, latching contact, single pole, multi-pole, single throw, or multi-throw, touch screen graphical user interfaces (GUI), or any other suitable input that may be used to modulate electricity between components or to otherwise control functions of the primary response device 10. As an example, a control input 11 may comprise a button, and the control input 11 may be operated by pressing the button.

In some embodiments, a primary response device 10 may comprise may comprise a radio module 12 which may enable wireless communication to one or more other primary response devices 10, one or more secondary response devices 20, one or more secure storage devices 30, external access device(s), and/or network(s) through an antenna. Optionally, a radio module 22 may be controlled or operated by a controller 23 and/or a control input 11. Preferably, a radio module 12 may comprise a wireless communication transmitter, and the radio module 12 may be configured to generate one or more primary wireless alert signals 91. Optionally, a radio module 12 may comprise a wireless communication receiver, and the radio module 12 may be configured to receive one or more primary wireless alert signals 91, one or more secondary wireless alert signals 92, one or more law enforcement notification signal 93, or other wireless signals.

A radio module 12 may be configured to operate using any number of suitable wireless data communication protocols, techniques, or methodologies, including, without limitation: radio frequency (RF); IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. As an example, a radio module 12 may operate on a cellular band and may communicate with or receive a Subscriber Identity Module (SIM) card or other wireless network identifier.

In some embodiments, a controller 13 can be a digital device that, in terms of hardware architecture, may optionally comprise a dedicated processor and which may function as a computing platform. Generally, a controller 13 may include components or elements and suitably configured processing logic to support known or conventional operating features that are not described in detail herein. When in operation, the controller 13 is configured to generally control operations of the primary response device 10, optionally by executing software instructions stored within a memory.

In some embodiments, a controller 13 may comprise a processor that may include a mobile optimized processor such as optimized for power consumption and mobile applications or any other custom made or commercially available processor, a central processing unit (CPU), an auxiliary processor among several processors, a semiconductor-based microprocessor (in the form of a microchip or chip set), or generally any device for executing software instructions. In some embodiments, a controller 13 may comprise an integrated circuit (IC) that integrates one or more components on a single chip sometimes called a system on a chip (SoC) or (SOC). In further embodiments, a controller 13 may comprise a microcontroller (or MCU, short for microcontroller unit) which may be a small computer (SoC) on a single integrated circuit.

In some embodiments, a primary response device 10 may comprise a power source 15 which may provide electrical power to any component of the primary response device 10 that may require electrical power. Optionally, a power source 15 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 15 may comprise a power cord, kinetic or piezo electric battery charging device, a solar cell or photovoltaic cell, and/or inductive charging or wireless power receiver.

In some embodiments, a primary response device 10 may comprise a sound emitting device 16 which may be used to produce a plurality of sounds at a plurality of volume levels. Preferably, a sound emitting device 16 may be configured to produce sounds which may be used to audibly appraise a first user 201 when one or more wireless alert signals 91, 92, are generated by the primary response device 10 and/or received by the primary response device 10. For example, if the control input 11 is operated by the first user 201, the controller 13 may cause the sound emitting device 16 to emit a siren or other audible alarm that may comprise a warning sound. A sound emitting device 16 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

A local interface 17 may provide electronic communication between one or more components (11, 12, 13, 15, 16) of the primary response device 10. In some embodiments, a local interface 17 may comprise a printed circuit assembly (PCA), printed circuit board assembly or PCB assembly (PCBA), a circuit card assembly (CCA), or a backplane assembly, or any other suitable electrical connection and communication method including standard wiring and the like.

In preferred embodiments, a secondary response device 20 may comprise a portable electronic device which may be carried on the person of a user, such as a second user 202. A second user 202 may comprise an individual that may be assigned to function as a party responsible for using or obtaining an object, such as a firearm, that may be stored in a secure storage device 30 that may be located in a public location or building associated with the first user 201, such as a school, business, government building, stadium, etc. As an example, a public location may comprise a school, and second user 202 may comprise a teacher, instructor, aid, school principal, safety officer, or some other individual that may respond to an act or threat of violence against the school of the first user 201.

Figure 3:
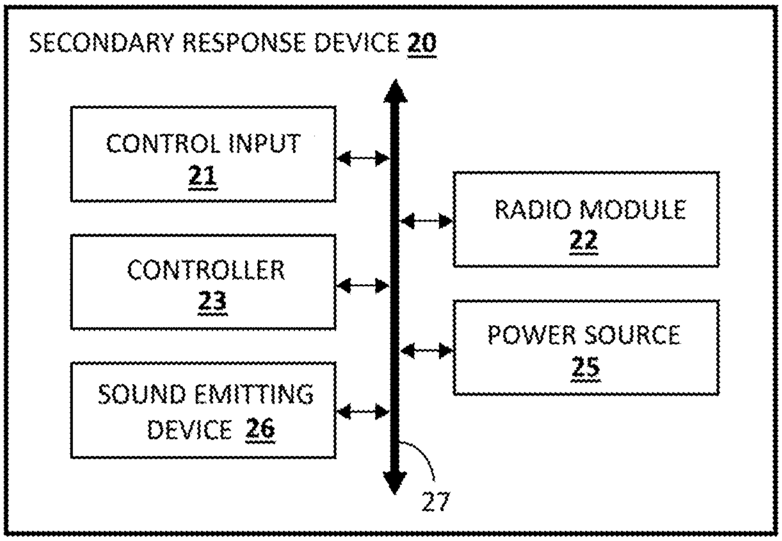
FIG. 3—FIG. 3 depicts a block diagram of some exemplary components of an example of a secondary response device according to various embodiments described herein.

FIG. 3 depicts a block diagram illustrating some exemplary components that a secondary response device 20 may comprise. In some embodiments, a secondary response device 20 may comprise one or more of a control input 21, a radio module 22, a controller 23, a power source 25, a sound emitting device 26, and a local interface 27 which may be contained in and/or coupled to a secondary body 24. A secondary body 24 may be configured in any shape and size. In preferred embodiments, secondary body 24 may be configured as a key fob or other hand-held device form factor that may be easily carried by or on the person of an individual, such as a second user 202.

In some embodiments, a secondary response device 20 may comprise may comprise one or more control inputs 21 that a user 202 may interact with or operate, such as turnable control knobs, a key pad, slide type switches, rocker type switches, toggle switches, push button or depressible button type switches, rotary switches, electromechanical relays, solid state relays, touch sensitive interfaces, and combinations thereof whether they are normally open, normally closed, momentary contact, latching contact, single pole, multi-pole, single throw, or multi-throw, touch screen graphical user interfaces (GUI), or any other suitable input that may be used to modulate electricity between components or to otherwise control functions of the secondary response device 20. As an example, a control input 21 may comprise a button, and the control input 21 may be operated by pressing the button. Optionally, a sound emitting device 26 may be activated to generate an audible alarm, such as a siren sound, beeping sound, etc., and deactivated to stop generating an audible alarm by a controller 23 and/or control input 21. In preferred embodiments, the sound emitting device 26 may be configured to stop generating an audible alarm when the control input 21 is operated by a user, such as a second user 202. For example, the secondary response device 20 may have a control input 21 that when pressed or otherwise operated causes sound emitting device 26 to stop generating audible alarm.

In some embodiments, a secondary response device 20 may comprise may comprise a radio module 22 which may enable wireless communication to one or more other primary response devices 10, one or more secondary response devices 20, one or more secure storage devices 30, external access device(s), and/or network(s) through an antenna. Optionally, a radio module 22 may be controlled or operated by a controller 23. Preferably, a radio module 22 may comprise a wireless communication transmitter, and the radio module 22 may be configured to generate one or more secondary wireless alert signals 92. Preferably, a radio module 22 may comprise a wireless communication receiver, and the radio module 22 may be configured to receive one or more primary wireless alert signals 91, one or more secondary wireless alert signals 92, one or more law enforcement notification signal 93, or other wireless signals.

A radio module 22 may be configured to operate using any number of suitable wireless data communication protocols, techniques, or methodologies, including, without limitation: radio frequency (RF); IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. As an example, a radio module 22 may operate on a cellular band and may communicate with or receive a Subscriber Identity Module (SIM) card or other wireless network identifier.

In preferred embodiments, the secondary wireless alert signal 92 generated by the radio module 22 of the secondary response device 20 may comprise a relatively short-range wireless signal such as a Radio Frequency Identification (RFID) signal so that the secondary wireless alert signal 92 may be required to be positioned proximate to the secure storage device 30 in order for the communication module 42 to receive the secondary wireless alert signal 92. For example, the secondary wireless alert signal 92 generated by the secondary response device 20 may comprise low-frequency (LF) RFID that has as a short range of a few inches to less than six feet or high-frequency (HF) RFID that has a standard range of a few inches to several feet. Other relatively short range secondary wireless alert signals 92 communication standards that may be used may include Bluetooth, Zigbee, Z-Wave, Ultra Wideband (UWB), Near-Field Communications (NFC), and Infrared.

In some embodiments, a controller 23 can be a digital device that, in terms of hardware architecture, may optionally comprise a dedicated processor and which may function as a computing platform. Generally, a controller 23 may include components or elements and suitably configured processing logic to support known or conventional operating features that are not described in detail herein. When in operation, the controller 23 is configured to generally control operations of the secondary response device 20, optionally by executing software instructions stored within a memory.

In some embodiments, a controller 23 may comprise a processor that may include a mobile optimized processor such as optimized for power consumption and mobile applications or any other custom made or commercially available processor, a central processing unit (CPU), an auxiliary processor among several processors, a semiconductor-based microprocessor (in the form of a microchip or chip set), or generally any device for executing software instructions. In some embodiments, a controller 23 may comprise an integrated circuit (IC) that integrates one or more components on a single chip sometimes called a system on a chip (SoC) or (SOC). In further embodiments, a controller 23 may comprise a microcontroller (or MCU, short for microcontroller unit) which may be a small computer (SoC) on a single integrated circuit.

In some embodiments, a secondary response device 20 may comprise a power source 25 which may provide electrical power to any component of the secondary response device 20 that may require electrical power. Optionally, a power source 25 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 25 may comprise a power cord, kinetic or piezo electric battery charging device, a solar cell or photovoltaic cell, and/or inductive charging or wireless power receiver.

In some embodiments, a secondary response device 20 may comprise a sound emitting device 26 which may be used to produce a plurality of sounds at a plurality of volume levels. Preferably, a sound emitting device 26 may be configured to produce sounds which may be used to audibly appraise a second user 202 when one or more wireless alert signals 91, 92, are generated by the secondary response device 20 and/or received by the secondary response device 20. For example, if one or more wireless alert signals 91, 92, are received by the radio module 22, the controller 23 may cause the sound emitting device 26 to emit a siren or other warning sound. In preferred embodiments, the sound emitting device 26 is configured to generate an audible alarm in response to the radio module 22 receiving the primary alert signal 91.

A sound emitting device 26 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

A local interface 27 may provide electronic communication between one or more components (21, 22, 23, 25, 26) of the secondary response device 20. In some embodiments, a local interface 27 may comprise a printed circuit assembly (PCA), printed circuit board assembly or PCB assembly (PCBA), a circuit card assembly (CCA), or a backplane assembly, or any other suitable electrical connection and communication method including standard wiring and the like.

In preferred embodiments, a secure storage device 30 may comprise a lockable container, such as a gun safe, locking cabinet, etc., which may be coupled to an object in a generally non-movable manner so that the secure storage device 30 may not be moved while its door 33 is in the closed position 71. Generally, a secure storage device 30 may comprise a lockable container, such as a gun safe, that may be used to securely store objects, such as firearms in a location or building, such as a school, business, government building, stadium, etc., and opening of the door 33 may require that the secure storage device 30 receives a primary wireless alert signal 91, a secondary wireless alert signal 92, and an unlocking input from a user(s) 201, 202, and more preferably from a second user 202, that is assigned to the secure storage device 30. A first user 201 may comprise an individual that may be assigned to function as a party responsible for ensuring the safety of a public location or building, such as a school, business, government building, stadium, etc. As an example, a public location may comprise a school, and first user 201 may comprise a school principal, safety officer, or some other executor of authority of the school.

Figure 4:
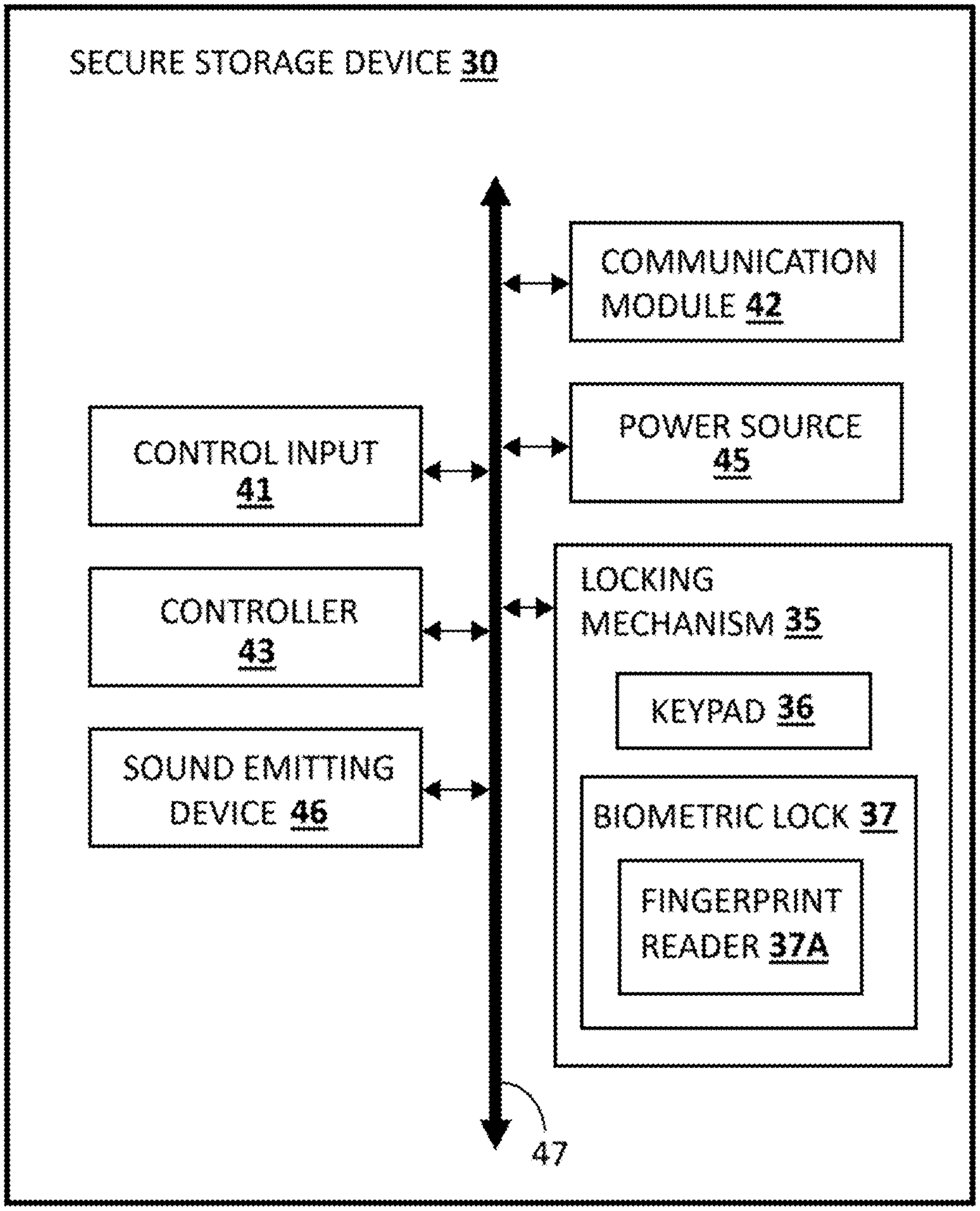
FIG. 4—FIG. 4 illustrates a block diagram of some exemplary components of an example of a secure storage device according to various embodiments described herein.
Figure 5A:
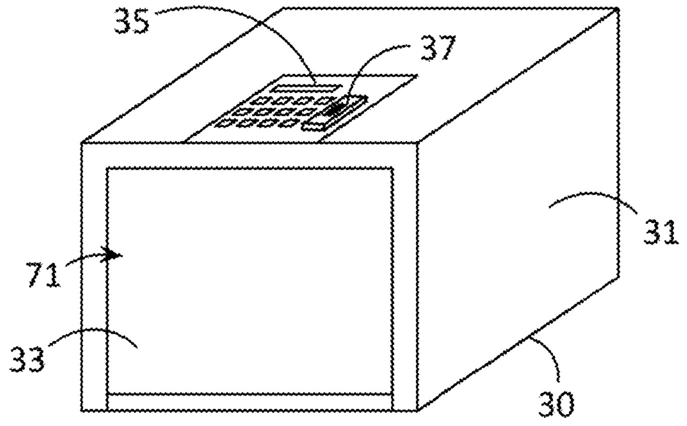
FIG. 5A—FIG. 5A shows a perspective view of an example of a secure storage device having its door in a closed position according to various embodiments described herein.
Figure 5B:
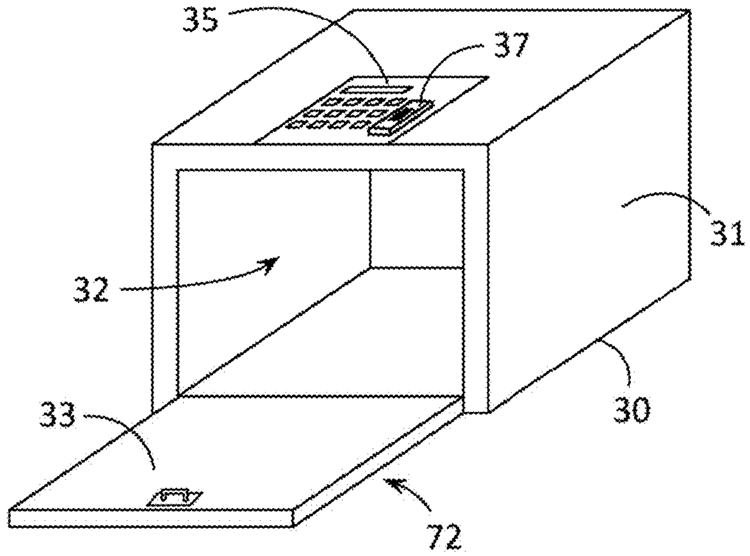
FIG. 5B—FIG. 5B depicts a perspective view of an example of a secure storage device having its door in an open position according to various embodiments described herein.

FIGS. 4 and 5 depict a block diagram and schematic diagram illustrating some exemplary components that a secure storage device 30 may comprise. In some embodiments, a secure storage device 30 may comprise a body 31, a storage cavity 32, a door 33, and a locking mechanism 35. The body 31 may define the storage cavity 32, and the door 33 may be movably coupled to the body 31, such as via hinges, so that the door 33 is movable between a closed position 71 and an open position 72. The body 31 and door 33 may be made from tamper resistant and fire resistant materials, such as steel, Gypsum board, and other materials commonly used in the construction of gun safes, and other lockable theft deterring storage containers. The storage cavity 32 may be accessible when the door 33 is in the open position 72, and the storage cavity 32 may be inaccessible when the door 33 is in the closed position 71. The locking mechanism 35 may govern the ability of the door 33 to be moved from the closed position 71 and into the open position 72. The locking mechanism 35 may be changeable between a locked state and an unlocked state. When the locking mechanism 35 is in the locked state the door 33 generally is not able to be moved from the closed position 71 and into the open position 72, when the locking mechanism 35 is in the unlocked state the door 33 is generally able to be moved from the closed position 71 and into the open position 72.

In some embodiments, a secure storage device 30 may comprise one or more of a control input 41, a communication module 42, a controller 43, a power source 45, a sound emitting device 46, and a local interface 47 which may be contained in and/or coupled to the body 31.

In some embodiments, a secure storage device 30 may comprise a locking mechanism 35 which may govern the ability of the door 33 to be moved from the closed position 71 and into the open position 72. A locking mechanism 35 may comprise an electronic actuator or other device for moving a locking latch or the like which may engage with the door 33 when the locking mechanism 35 is in a locked state and which may be disengaged from the door 33 when the locking mechanism 35 is in an unlocked state. Example actuators which may be used to change the locking mechanism from the locked state to the unlocked state may include: comb drive, digital micromirror device, solenoid, electric motor, electroactive polymer, hydraulic cylinder, piezoelectric actuator, etc.

The locking mechanism 35 may be configured to receive an unlocking input from a user, such as a second user 202. In some embodiments, a locking mechanism 35 may comprise a keypad 36, such as having a plurality of alpha and/or numeric keys that a user 202 may press and interact with in order to provide an alpha and/or numeric code that may comprise the unlocking input to the locking mechanism 35. In preferred embodiments, a locking mechanism 35 may comprise a biometric lock 37. A biometric lock 37 is a security device that uses unique physical or behavioral characteristics of an individual as an unlocking input, such as a second user 202, to grant access to a locked space. Biometric locks can use fingerprint recognition, facial recognition, iris scanners, or voice patterns. In some embodiments, a biometric lock 37 may comprise a fingerprint reader 37A and unlocking input may be provided by the fingerprint reader 37A receiving a fingerprint of a specific user(s), such as a second user 202. In further embodiments, a biometric lock 37 may comprise any other type of biometric lock and unlocking input may be provided by the biometric lock 37 receiving biometric data of a specific user(s), such as a second user 202.

In preferred embodiments, the locking mechanism 35 may require receiving an unlocking input from a user, such as a second user 202, and the communication module 42 may require receiving the secondary wireless alert signal 92 before the locking mechanism 35 is changeable from the locked state to the unlocked state. In further embodiments, the secondary wireless alert signal 92 may be required to be received by the communication module 42 before the locking mechanism 35 receives the unlocking input from the user, such as a second user 202, in order for the locking mechanism 35 to be changed from the locked state to the unlocked state. In further embodiments, the locking mechanism 35 may require receiving an unlocking input from a user, such as a second user 202, and the communication module 42 may require receiving both the primary wireless signal 91 and the secondary wireless alert signal 92 in order for the locking mechanism 35 to change from the locked state to the unlocked state. In further embodiments, the communication module 42 may require receiving the primary wireless signal 91 before receiving the secondary wireless alert signal 92 and the communication module 42 may require receiving the secondary wireless alert signal 92 before receiving an unlocking input from a user, such as a second user 202, in order for the locking mechanism 35 to change from the locked state to the unlocked state. In preferred embodiments, the secondary wireless alert signal 92 is required to be received by the communication module 42 before electric power from the power source 45 is supplied to the biometric lock 37 of the locking mechanism 35 so that the biometric lock 37 is not able to be operated by a user, such as a second user 202, until the secondary wireless alert signal 92 is received by the communication module 42.

In some embodiments, a secure storage device 30 may comprise one or more control inputs 41 that a user 201 may interact with or operate, such as turnable control knobs, a key pad, slide type switches, rocker type switches, toggle switches, push button or depressible button type switches, rotary switches, electromechanical relays, solid state relays, touch sensitive interfaces, and combinations thereof whether they are normally open, normally closed, momentary contact, latching contact, single pole, multi-pole, single throw, or multi-throw, touch screen graphical user interfaces (GUI), or any other suitable input that may be used to modulate electricity between components or to otherwise control functions of the a secure storage device 30. For example, control inputs 41 may be used to program a locking mechanism 35 with unlocking input that will then be required to be input by a user, such as a second user 201 when the user, such as a second user 201 desires to operate the locking mechanism 35 to unlock and open the door 33.

In some embodiments, a secure storage device 30 may comprise may comprise a communication module 42 which may enable wireless communication to one or more other primary response devices 10, one or more secondary response devices 20, one or more other secure storage devices 30, external access device(s), such as a law enforcement agency computing and networking device 50, and/or network(s) through an antenna or wired connection. Preferably, a communication module 42 may comprise a wireless communication receiver, and the communication module 42 may be configured to receive one or more primary wireless alert signals 91, one or more secondary wireless alert signals 92, one or more law enforcement notification signals 93, or other wireless signals. A law enforcement notification signal 93 may comprise an electronically generated and communicated signal that may be sent to emergency service departments, such as a police department, sheriff department, 911 or emergency response unit, etc., computing and networking devices and which may notify the emergency service departments of a condition of one or more elements 10, 20, 30, of the system 100. Optionally, a communication module 42 may comprise a wireless communication transmitter and/or a wired communication port, such as an Ethernet port, fiber optic, port, or other hard line network communication device or method, and the communication module 42 may be configured to generate one or more law enforcement notification signals 93 that may be wirelessly and/or wiredly or hard line communicated to a law enforcement agency computing and networking device 50 of a law enforcement agency. In preferred embodiments, the communication module 42 may be configured to generate a law enforcement notification signal 93 in response to the locking mechanism 35 changing from the locked state and into the unlocked state. In further embodiments, the communication module 42 may be configured to generate a law enforcement notification signal 93 in response to the locking mechanism detecting 35 that the door 33 is moved from the closed position 71 and into the open position 72.

In some embodiments, a communication module 42 may be configured to operate using any number of suitable wireless data communication protocols, techniques, or methodologies, including, without limitation: radio frequency (RF); IrDA (infrared); Bluetooth; ZigBee (and other variants of the IEEE 802.15 protocol); IEEE 802.11 (any variation such as WiFi); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. As an example, a communication module 42 may operate on a cellular band and may communicate with or receive a Subscriber Identity Module (SIM) card or other wireless network identifier.

In some embodiments, a controller 43 can be a digital device that, in terms of hardware architecture, may optionally comprise a dedicated processor and which may function as a computing platform. Generally, a controller 43 may include components or elements and suitably configured processing logic to support known or conventional operating features that are not described in detail herein. When in operation, the controller 43 is configured to generally control operations of the secure storage device 30, optionally by executing software instructions stored within a memory.

In some embodiments, a controller 43 may comprise a processor that may include a mobile optimized processor such as optimized for power consumption and mobile applications or any other custom made or commercially available processor, a central processing unit (CPU), an auxiliary processor among several processors, a semiconductor-based microprocessor (in the form of a microchip or chip set), or generally any device for executing software instructions. In some embodiments, a controller 43 may comprise an integrated circuit (IC) that integrates one or more components on a single chip sometimes called a system on a chip (SoC) or (SOC). In further embodiments, a controller 43 may comprise a microcontroller (or MCU, short for microcontroller unit) which may be a small computer (SoC) on a single integrated circuit.

In some embodiments, a secure storage device 30 may comprise a power source 45 which may provide electrical power to any component of the secure storage device 30 that may require electrical power. Optionally, a power source 45 may comprise a battery, such as a lithium ion battery, nickel cadmium battery, alkaline battery, or any other suitable type of battery, a fuel cell, a capacitor, a super capacitor, or any other type of energy storing and/or electricity releasing device. In further embodiments, a power source 45 may comprise a power cord, kinetic or piezo electric battery charging device, a solar cell or photovoltaic cell, and/or inductive charging or wireless power receiver.

In some embodiments, a secure storage device 30 may comprise a sound emitting device 46 which may be used to produce a plurality of sounds at a plurality of volume levels. Preferably, a sound emitting device 46 may be configured to produce sounds which may be used to audibly appraise a first user 201 when one or more primary wireless alert signals 91 are generated by the primary response device 10, when one or more secondary wireless alert signal 92 are generated by a secondary response device 20, and/or when one or more wireless alert signals 91, 92, received by the secure storage device 30. For example, a primary wireless alert signal 91 is received by the radio module 45, the controller 43 may cause the sound emitting device 46 to emit a siren or other warning sound.

Optionally, a sound emitting device 46 may be activated to generate an audible alarm, such as a siren sound, beeping sound, etc., and deactivated to stop generating an audible alarm by a controller 43 and/or the locking mechanism 35. In some embodiments, the sound emitting device 46 may be configured to generate an audible alarm in response to the locking mechanism 35 changing from the locked state to the unlocked state. In some embodiments, the sound emitting device 46 may be configured to generate an audible alarm in response to the door 33 being moved from the closed position 71 and into the open position 72.

A sound emitting device 46 may comprise a buzzer, a piezoelectric sound producing device, a dielectric elastomer sound producing device, a buzzer, a moving coil loudspeaker, an electrostatic loudspeaker, an isodynamic loudspeaker, a piezo-electric loudspeaker, or any other device capable of producing one or more sounds.

A local interface 47 may provide electronic communication between one or more components (35, 41, 42, 43, 45, 46) of the secure storage device 30. In some embodiments, a local interface 47 may comprise a printed circuit assembly (PCA), printed circuit board assembly or PCB assembly (PCBA), a circuit card assembly (CCA), or a backplane assembly, or any other suitable electrical connection and communication method including standard wiring and the like.

Figure 6:
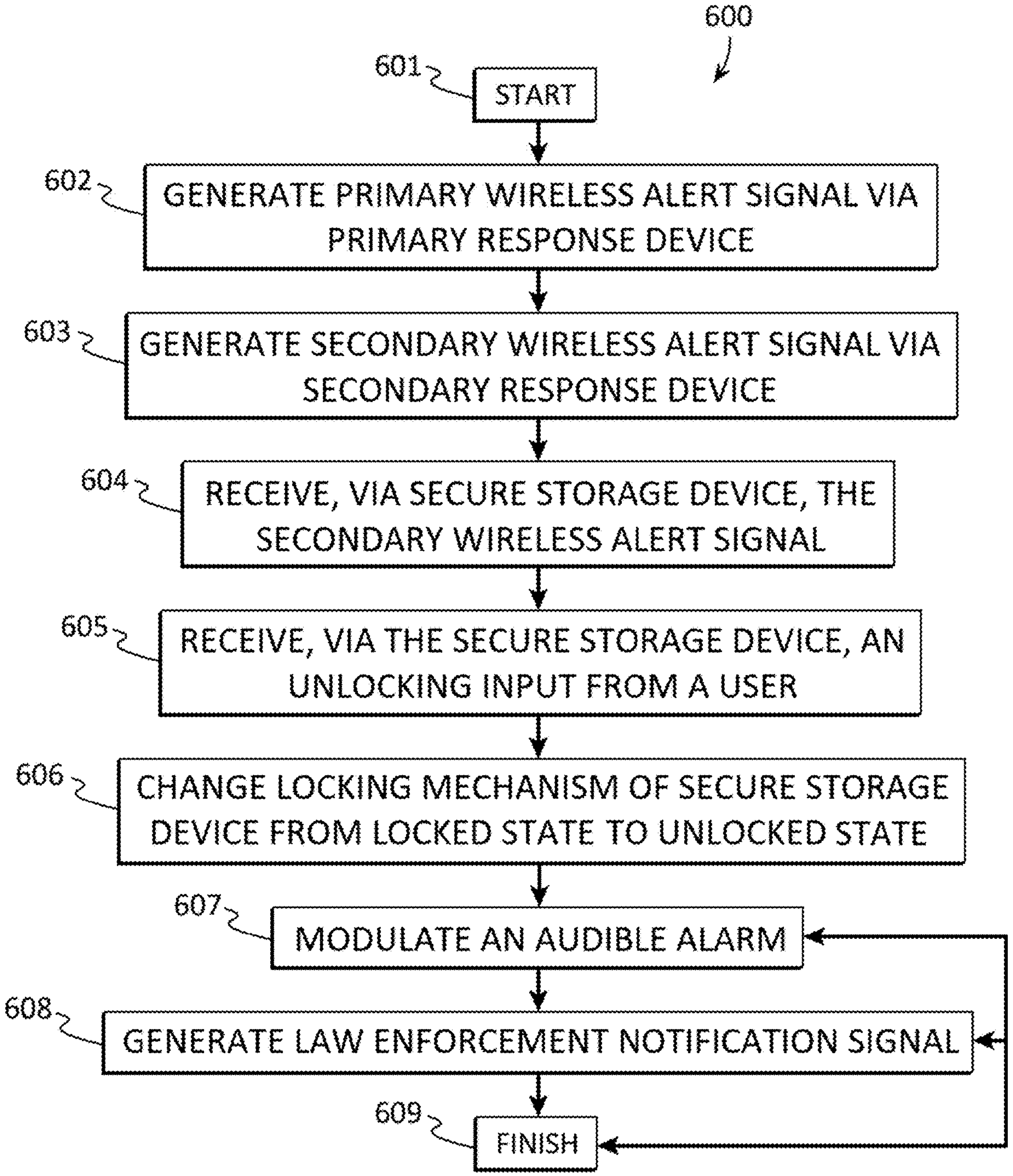
FIG. 6—FIG. 6 illustrates a block diagram of an example of a secure storage system method according to various embodiments described herein.

FIG. 6 shows a block diagram of an example of a secure storage method which may be used for securely storing and controlling access to objects, such as firearms, in public locations ("the method") 600 according to various embodiments described herein. In some embodiments, the method 600 may be used to change the locking mechanism 35 of a secure storage device 30 from a locked state to an unlocked state to allow objects in the storage cavity 32 of the secure storage device 30 to change from being generally inaccessible, e.g., being accessible to an individual without safe cracking tools, to being accessible.

The method 600 may start 601 and a primary wireless alert signal 91 may be generated via a primary response device 10 in step 602. In some embodiments, the primary response device 10 may have control input 11 and a radio module 12, and the radio module 12 may be configured to generate the primary wireless alert signal 91 when the control input 11 is operated by a user, such as a first user 201. For example, a first user 201 may comprise a school security officer that may patrol a school and notice a school shooter scenario in progress. The first user 201 may then press a button type of control input 11 and a radio module 12, optionally controlled by a controller 13, may generate the primary wireless alert signal 91.

In step 603, a secondary wireless alert signal 92 may be generated via a secondary response device 20. In some embodiments, the secondary response device 20 may have a radio module 22, and the radio module 22 may be configured to generate a secondary wireless alert signal 92 in response to receiving primary wireless alert signal 91. Continuing the above example, the school may have one or more teachers, staff, administrators, resource officers, etc., that may each have a secondary response device 20, and the radio module 22, optionally controlled by a controller 23, of each secondary response device 20 may be configured to generate a unique secondary wireless alert signal 92 after the radio module 22 receives the primary wireless alert signal 91 generated by the primary response device 10.

In preferred embodiments, the secondary wireless alert signal 92 generated by the radio module 22 of the secondary response device 20 may comprise a relatively short-range wireless signal such as a Radio Frequency Identification (RFID) signal so that the secondary wireless alert signal 92 may be required to be positioned proximate to the secure storage device 30 in order for the communication module 42 to receive the secondary wireless alert signal 92. For example, the secondary wireless alert signal 92 generated by the secondary response device 20 may comprise low-frequency (LF) RFID that has as a short range of a few inches to less than six feet or high-frequency (HF) RFID that has a standard range of a few inches to several feet. Other relatively short range secondary wireless alert signals 92 communication standards that may be used may include Bluetooth, Zigbee, Z-Wave, Ultra Wideband (UWB), Near-Field Communications (NFC), and Infrared.

In step 604 a secure storage device 30 may receive the secondary wireless alert signal 92. The secure storage device 30 may have a body 31, a storage cavity 32, a door 33, a communication module 42, and a locking mechanism 35. The body 31 may define the storage cavity 32, and the door 33 may be movably coupled to the body 31 so that the door 33 may be movable between a closed position 71 and an open position 72. The storage cavity 32 may be accessible when the door 33 is in the open position 72, and the storage cavity 32 may be inaccessible when the door 33 is in the closed position 71. The locking mechanism 35 may govern the ability of the door 33 to be moved from the closed position 71 and into the open position 72. The communication module 42 may be in electronic communication with the locking mechanism 35, and the locking mechanism 35 may be changeable between a locked state and an unlocked state. When the locking mechanism 35 is in the locked state the door 33 generally is not able to be moved from the closed position 71 and into the open position 72, when the locking mechanism 35 is in the unlocked state the door 33 is generally able to be moved from the closed position 71 and into the open position 72. Continuing the above example, once the primary wireless alert signal 91 is received by a secondary response device 20 of a user, such as a second user 202, the user may proceed to the location of their assigned secure storage device 30 and preferably may position their secondary response device 20 proximate, e.g., within 12 feet, of the secure storage device 30 in order for the communication module 42 to receive the secondary wireless alert signal 92 generated by their secondary response device 20.

In step 605 the secure storage device 30 may receive an unlocking input from a user, such as a second user 202. In some embodiments, a locking mechanism 35 may comprise a keypad 36, such as having a plurality of alpha and/or numeric keys that a user 202 may press and interact with in order to provide an alpha and/or numeric code that may comprise the unlocking input to the locking mechanism 35. In preferred embodiments, a locking mechanism 35 may comprise a biometric lock 37. A biometric lock 37 is a security device that uses unique physical or behavioral characteristics of an individual as an unlocking input, such as a second user 202, to grant access to a locked space. Biometric locks can use fingerprint recognition, facial recognition, iris scanners, or voice patterns. In some embodiments, a biometric lock 37 may comprise a fingerprint reader 37A and unlocking input may be provided by the fingerprint reader 37A receiving a fingerprint of a specific user(s), such as a second user 202. In further embodiments, a biometric lock 37 may comprise any other type of biometric lock and unlocking input may be provided by the biometric lock 37 receiving biometric data of a specific user(s), such as a second user 202.

In step 606, the locking mechanism 35 of the secure storage device 30 may be changed from a locked state to or into an unlocked state. In some embodiments, the locking mechanism 35 of the secure storage device 30 may change from the locked state to the unlocked state after both of: the secondary wireless alert signal 92 is received by the communication module 42; and the unlocking input is received via the locking mechanism 35. In preferred embodiments, the secondary wireless alert signal 92 is required to be received by the communication module 42 before the locking mechanism 35 receives the unlocking input from the user, such as the second user 202, in order for the locking mechanism 35 to be changed from the locked state to the unlocked state. In further embodiments, the secondary wireless alert signal 92 is required to be received by the communication module 42 before electric power from the power source 45 is supplied to the biometric lock 37 of the locking mechanism 35 so that the biometric lock 37 is not able to be operated by a user, such as a second user 202, until the secondary wireless alert signal 92 is received by the communication module 42.

In some embodiments, the method 600 may comprise step 607 in which one or more audible alarms may be modulated by a primary response device 10, secondary response device 20, and/or secure storage device 30. An audible alarm may comprise a siren sound, beeping sound, etc., which may be heard by humans. In some embodiments, an audible alarm may be modulated by having a sound emitting device 16, 26, 46, begin generating the audible alarm when it was not being generated prior to being modulated. In some embodiments, an audible alarm may be modulated by having a sound emitting device 16, 26, 46, stop generating the audible alarm when it was being generated prior to being modulated. In some embodiments, an audible alarm may be modulated by having a sound emitting device 16, 26, 46, change, such as by increasing or decreasing, the volume of the audible alarm than the volume it was being generated at prior to being modulated.

In some embodiments of step 607, an audible alarm may be modulated by a sound emitting device 26 of a secondary response device 20 of step 603. In some embodiments, an audible alarm may be modulated by having a sound emitting device 26 of a secondary response device 20 of step 603 being configured to generate the audible alarm in response to the second radio module 22 of the secondary response device 20 receiving the primary alert signal 91. In some embodiments, a secondary response device 20 of step 603 may comprise a control input 21, and the sound emitting device 26 is configured to stop generating the audible alarm when the control input 21 is operated by a user, such as the second user 202.

In some embodiments of step 607, an audible alarm may be modulated by a sound emitting device 46 of the secure storage device 30. In some embodiments, a sound emitting device 46 of the secure storage device 30 may be configured to generate the audible alarm in response to the locking mechanism 35 changing from the locked state to the unlocked state. In some embodiments, a sound emitting device 46 of the secure storage device 30 may be configured to generate the audible alarm in response to the door 33 being moved from the closed position 71 and into the open position 72.

In some embodiments, the method 600 may comprise step 608 in which one or more law enforcement notification signals 93 may be generated and preferably communicated to a law enforcement agency computing and networking device 50 (e.g., a law enforcement agency computerized switchboard or other type of computing device that is configured to receive electronic communications). In some embodiments, the communication module 42 of the secure storage device 30 may be configured to generate one or more law enforcement notification signals 93 in response to the locking mechanism 35 changing from the locked state and into the unlocked state. In some embodiments, the communication module 42 of the secure storage device 30 may be configured to generate one or more law enforcement notification signals 93 in response to the door 33 being moved from the closed position 71 and into the open position 72.

Optionally after one of steps 606-608 are performed, the method 600 may finish 609.

While some exemplary shapes and sizes have been provided for elements of the system 100, it should be understood to one of ordinary skill in the art that a primary response device 10, secondary response device 20, secure storage device 30, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A secure storage system, the system comprising:

a primary response device having a first control input and a first radio module, the first radio module configured to generate a primary wireless alert signal when the first control input is operated;

a plurality of secondary response devices, each secondary response device of the plurality of secondary response devices having a second radio module, the first radio module configured to broadcast the primary wireless alert signal to the plurality of secondary response devices, and the second radio module is of each secondary response device configured to generate a secondary wireless alert signal in response to receiving the primary wireless alert signal;

a plurality of secure storage devices, each secure storage device of the plurality of secure storage devices having a body, a storage cavity, a communication module, a door, and a locking mechanism, the body defining the storage cavity, the door is movably coupled to the body and movable between a closed position and an open position, the storage cavity accessible when the door is in the open position and the storage cavity is inaccessible when the door is in the closed position, the locking mechanism governing the ability of the door to move from the closed position and into the open position, the communication module in electronic communication with the locking mechanism, the locking mechanism changeable between a locked state and an unlocked state; wherein when the locking mechanism is in the locked state the door is not movable from the closed position, wherein when the locking mechanism is in the unlocked state the door is movable from the closed position and into the open position, wherein each secondary response device is configured to generate a respective secondary wireless alert signal in response to receipt of the primary wireless alert signal, the respective secondary wireless alert signal enabling unlocking of at least one secure storage device of the plurality of secure storage devices, and wherein the locking mechanism of each secure storage device requires receiving an unlocking input from a user assigned to each secure storage device, and the communication module of each secure storage device requires receiving the respective secondary wireless alert signal generated by a respective secondary response device assigned to the user before the locking mechanism of that secure storage device is changeable from the locked state to the unlocked state.

2. The system of claim 1, wherein the communication module of each secure storage device requires receiving the respective secondary wireless alert signal associated with a respective secure storage device before the locking mechanism receives the unlocking input from the user in order for the locking mechanism to change from the locked state to the unlocked state.

3. The system of claim 1, wherein at least one secure storage device of the plurality of secure storage devices comprises a sound emitting device, and wherein the sound emitting device generates an audible alarm in response to the locking mechanism of the at least one secure storage device changing from the locked state to the unlocked state.

4. The system of claim 1, wherein at least one secure storage device of the plurality of secure storage devices comprises a sound emitting device, and wherein the sound emitting device generates an audible alarm in response to the door of the at least one secure storage device being moved from the closed position and into the open position.

5. The system of claim 1, wherein at least one secure storage device of the plurality of secure storage devices is configured to generate a law enforcement notification signal in response to the locking mechanism of the at least one secure storage device changing from the locked state and into the unlocked state.

6. The system of claim 1, wherein the locking mechanism of at least one secure storage device of the plurality of secure storage devices comprises a biometric lock.

7. The system of claim 6, wherein the communication module of at least one secure storage device of the plurality of secure storage devices requires receiving the respective secondary wireless alert signal associated with the at least one secure storage device before electric power is supplied to the biometric lock of the at least one secure storage device, such that the biometric lock cannot receive the unlocking input until the secondary wireless alert signal is received.

8. The system of claim 6, wherein the biometric lock comprises a fingerprint reader.

9. The system of claim 1, wherein at least one secure storage device of the plurality of secure storage devices comprises a sound emitting device, and wherein the sound emitting device generates an audible alarm in response to the communication module of the at least one secure storage device receiving the primary wireless alert signal.

10. A secure storage method, the method comprising the following steps performed in the following sequence:

generating a primary wireless alert signal via a primary response device, the primary response device having a first control input and a first radio module, the first radio module is configured to generate the primary wireless alert signal when the first control input is operated;

receiving, at each secure storage device of a plurality of secure storage devices, via a respective communication module of each secure storage device, at least the primary wireless alert signal, each secure storage device having a body, a storage cavity, a door, and a locking mechanism, the body defining the storage cavity, the door movably coupled to the body and movable between a closed position and an open position, the storage cavity accessible when the door is in the open position and the storage cavity inaccessible when the door is in the closed position, the locking mechanism governing the ability of the door to be moved from the closed position and into the open position, the communication module in electronic communication with the locking mechanism, the locking mechanism is-changeable between a locked state and an unlocked state, wherein when the locking mechanism is in the locked state the door is not movable from the closed position, wherein when the locking mechanism is in the unlocked state the door is movable from the closed position and into the open position;

receiving, via the locking mechanism of at least one secure storage device of the plurality of secure storage devices, an unlocking input from a user assigned to the at least one secure storage device; and changing the locking mechanism of the at least one secure storage device from the locked state to the unlocked state after: (i) the communication module of the at least one secure storage device has received the primary wireless alert signal; and (ii) the locking mechanism of the at least one secure storage device has received the unlocking input from the user assigned to the at least one secure storage device.

11. The method of claim 10, further comprising the step of generating an audible alarm, wherein the at least one secure storage device comprises a sound emitting device, the sound emitting device configured to generate the audible alarm in response to the locking mechanism changing from the locked state to the unlocked state.

12. The method of claim 10, further comprising the step of generating an audible alarm, wherein the at least one secure storage device comprises a sound emitting device, the sound emitting device configured to generate the audible alarm in response to the door being moved from the closed position and into the open position.

13. The method of claim 10, further comprising the step of generating a law enforcement notification signal, the at least one secure storage device is configured to generate the law enforcement notification signal in response to the locking mechanism changing from the locked state and into the unlocked state.

14. The method of claim 10, further comprising the step of generating an audible alarm, wherein the at least one secure storage device comprises a sound emitting device, the sound emitting device configured to generate the audible alarm in response to the communication module of the at least one secure storage device receiving the primary wireless alert signal.

15. The method of claim 10, further comprising the step of generating a secondary wireless alert signal via a secondary response device assigned to a user, the at least one secure storage device also assigned to the user, the secondary response device configured to generate the secondary wireless alert signal in response to receiving the primary wireless alert signal, and the secondary wireless alert signal uniquely generated by the secondary response device, wherein the secondary wireless alert signal is additionally required for the locking mechanism of the at least one secure storage device to change from the locked state to the unlocked state.

16. The method of claim 15, wherein the communication module of the at least one secure storage device requires receiving the secondary wireless alert signal before the locking mechanism receives the unlocking input from the user in order for the locking mechanism to be changed from the locked state to the unlocked state.

17. The method of claim 16, wherein the locking mechanism of the at least one secure storage device comprises a biometric lock.

18. The method of claim 17, wherein the communication module of the at least one secure storage device requires receiving the secondary wireless alert signal before electric power is supplied to the biometric lock.

19. The method of claim 18, wherein the biometric lock comprises a fingerprint reader.

* * * * *